INVENTORS.
GUY F. GARDNER
EVERETT W. TODD
BY Wolfe, Hubbard, Voit & Osann
ATTORNEYS.

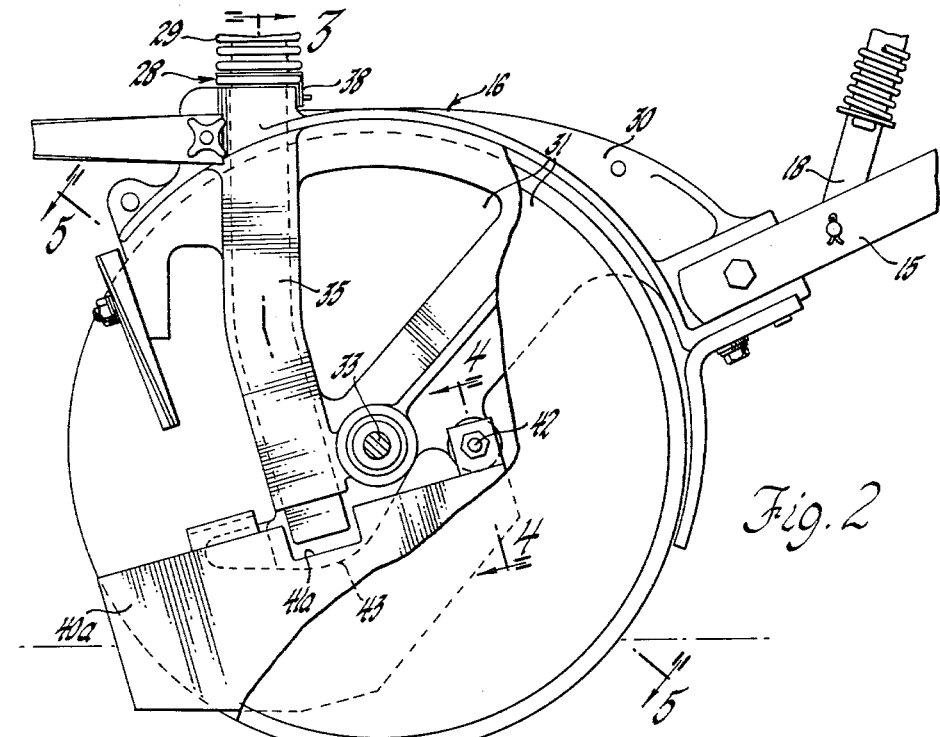
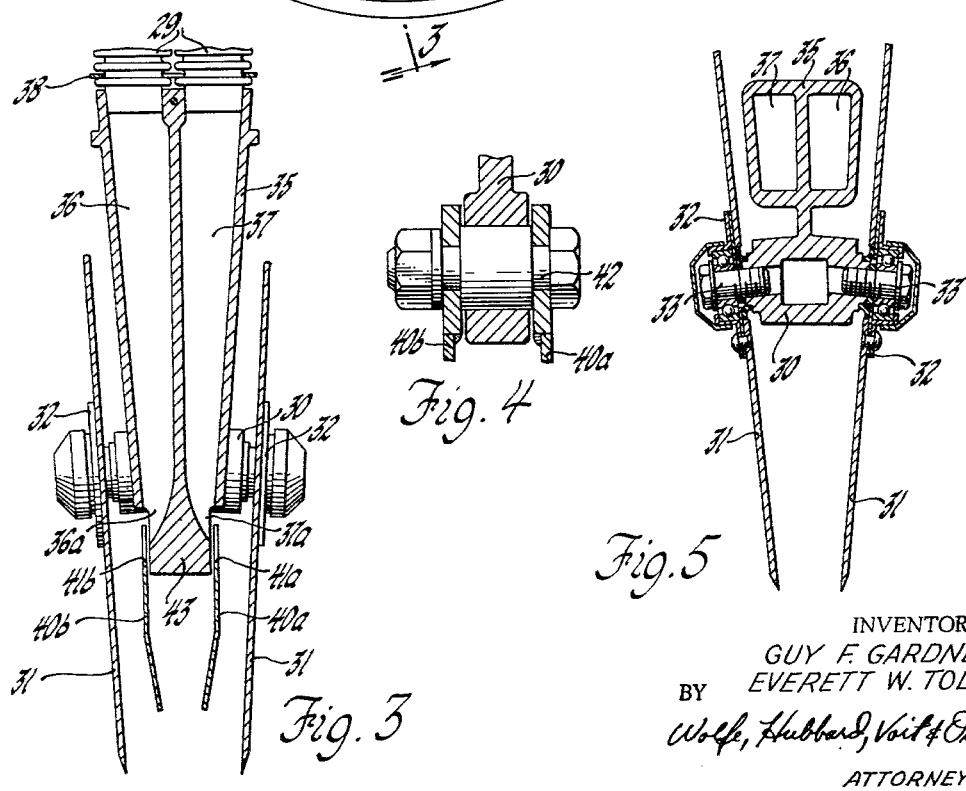

United States Patent Office 3,228,363
Patented Jan. 11, 1966

3,228,363
ROW CROP PLANTER OF THE GRAIN
DRILL TYPE
Guy F. Gardner and Everett W. Todd, Dearborn, Mich.,
assignors to Massey-Ferguson, Inc., Detroit, Mich., a
corporation of Maryland
Filed July 2, 1963, Ser. No. 292,233
3 Claims. (Cl. 111—73)

The present invention relates to agriculture implements and more specifically to row crop planters, such as grain drills, of the type in which two separate products, such, for example, as fertilizer and seed, are individually dispensed by the same machine.

A primary object of the present invention is to provide an improved grain drill for reliably dispensing metered quantities of separate products and for causing the dispensed products to be reliably deposited within the soil in a desired spaced, side-by-side relationship. In this connection, an object is to provide an improved grain drill for placing seed and fertilizer within the soil in a desired spaced, side-by-side relationship so that the fertilizer does not burn the roots of the plants emerging from the seeds before they sufficiently mature. Further, in this connection, an object is to provide an improved grain drill for placing both seed and fertilizer within the soil in a manner so that lower plant loss results therefrom.

A more specific object is to provide an improved grain drill as characterized hereinabove which is operable to simultaneously plant seed and deposit fertilizer in side-by-side relation in individual furrows formed adjacent one another. A related object is to provide a grain drill of this type wherein spacer means is provided for directing the plant seed and fertilizer into the furrows in a desired spaced relationship. In this connection, an object is to provide a grain drill of this type wherein the spacer means is free to move up and down with changing ground conditions.

A further object of this invention is to provide an improved grain drill of the type specified hereinabove which is rugged and solidly constructed so as to be well suited for ordinary farm use. A related object is to provide a grain drill of this type which is economical to manufacture and which requires no critical adjustments. Another object is to provide a grain drill of this type which is characterized in its efficiency, reliability, and compactness.

Other objects and advantages of the invention will become apparent upon reading the following detailed description and upon reference to the drawings, in which:

FIG. 2 is an enlarged fragmentary section of the furrow opener portion of the grain drill shown in FIG. 1;

FIG. 3 is a fragmentary section taken along the plane of line 3—3 in FIG. 2;

FIG. 4 is a fragmentary section taken along the plane of line 4—4 of FIG. 2; and FIG. 5 is a section taken along the plane of line 5—5 of FIG. 2.

Figure 1:
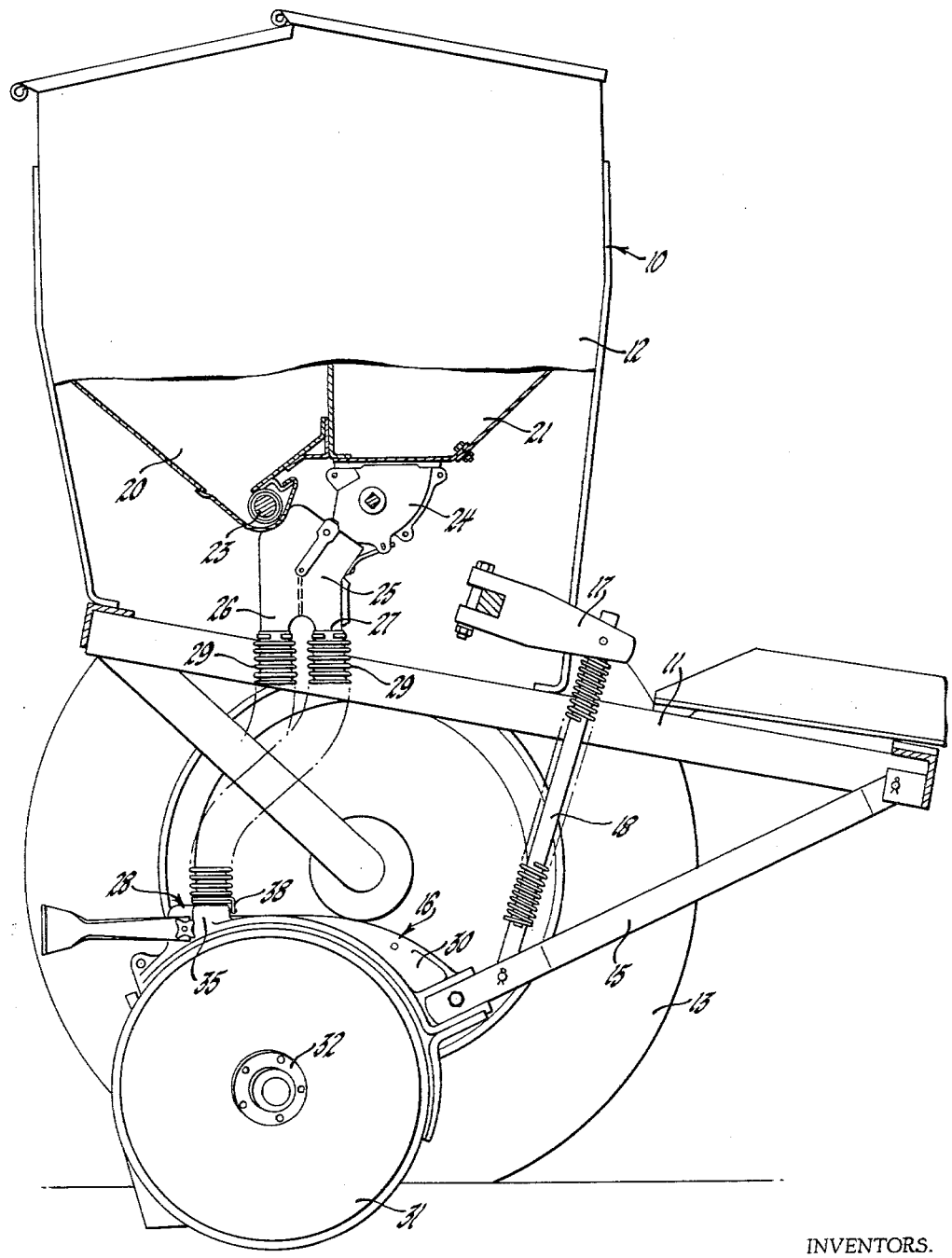
FIGURE 1 is a fragmentary section of a grain drill constructed in accordance with the present invention.

While the invention has been described in connection with a certain preferred embodiment, it is to be understood that the invention is not to be limited to the disclosed embodiment but, on the contrary, the invention is intended to cover the various modifications and equivalent arrangements included within the spirit and scope of the appended claims.

Referring to the drawings and more specifically to FIG. 1, a grain drill 10 is illustrated which is constructed in accordance with the teachings of the present invention. The grain drill includes a main transport frame 11 and the forward end thereof, not illustrated, is adapted to be conventionally coupled to a tractor or the like, also not illustrated. The rear end of the frame forms a flat bed upon which a hopper 12 is mounted. The frame 11 is flanked by transport wheels 13 (one shown) which support the grain drill 10 for movement. A subframe 15 is associated with the main frame 11 for supporting one or more dual, furrow opening devices 16 between the transport wheels 13. Preferably, the subframe is mounted in floating fashion and a rockable lever 17 is provided together with a spring-loaded link 18 for selectively placing and displacing the furrow opening devices in the soil. Though, in the illustrated embodiment, only one subframe and one furrow opening device are illustrated, it is to be understood that a greater plurality of serially disposed subframes and furrow opening devices may be mounted between the transporting wheels 13.

The hopper 12 is provided with two compartments 20 and 21 in order that two separate products, such as seed and fertilizer, may be dispensed by the grain drill in the manner to be hereinafter described. Alternatively, two separate and distinct hoppers, rather than the compartmented hopper 12, may be provided without departing from the spirit of the invention. For the purpose of controlling the amount of the products dispensed from the hopper compartments at any given time, a pair of metering devices 23 and 24 are respectively associated with the compartments 20 and 21. In the present instance, the contents of the compartments are gravity fed into the metering devices from the bottom of the hopper whereas the invention is intended to cover the use of any desired feeding devices.

The metering devices 23 and 24 cause the predetermined amounts of the products to be fed into a divided casing 25 having a pair of supply channels ending in separate nozzles 26 and 27 so that the two products are maintained in a segregated status after being discharged from the hopper compartments 20 and 21. From the nozzles 26 and 27, the two products are fed to a dispensing assembly 28 positioned adjacent the furrow device 16 through flexible supply tubing 29 connected between the nozzles 26 and 27 and the dispensing assembly 28.

In the exemplified embodiment, the dual, furrow opening device 16 includes two parallel, laterally spaced openers for cutting parallel furrows in the ground when lowered thereinto and the dispensing assembly 28 simultaneously dispenses the metered contents of the compartments 20 and 21 into the furrows so that the two products are in side-by-side relationship in individual furrows.

Accordingly, the furrow opening device 16 includes a pair of relatively flat discs 31 disposed in face-to-face relationship on opposite sides of a support member 30 which forms a part of the subframe 15. The discs 31 are rivoted to hubs 32 which, in turn, are mounted on stub axles 33, such that the hubs and the associated discs are rotatable about the axles. Each stub axle 33 is mounted on the support member 30, flanking the same, so that the discs are disposed close together but without one interferring with the other's operation. The axles 33 are slightly canted (see FIGS. 3 and 5) so that the discs 31 converge in the forward direction of movement of the grain drill. The discs 31 are thus laterally spaced and positioned to open a pair of narrow parallel furrows in the ground when lowered thereinto and pulled in a forward direction by the subframe 15.

The dispensing assembly 28 is positioned between the discs 31 of the furrow opening device 16 and includes a dispenser casing 35 having a pair of parallel dispensing channels or nozzles 36 and 37. As illustrated, the dispenser casing 35 is cast as a part of the support member 30. Additionally, as may be seen, the channels 36 and 37 respectively have dispensing openings 36a and 37a positioned above the furrow positions for causing the products metered from the compartments 20 and 21 to be deposited into the furrows or trenches formed by the furrow opening device 16. For the purpose of causing the metered products to be fed into the channels 36 and 37, the channels are connected to the supply tubes 29, a clamp 38 being provided for securely fastening the supply tubing 29 to the dispenser casing 35.

With such grain drills as described hereinabove, it has been found that the dispensed products are often placed too close together in the ground. This is true since the products are gravity fed from the dispensing openings 36a and 37a and no means are provided for insuring the depositing in the ground of these products in a desired spaced relationship. Such random depositing of products is often undesirable. For example, with the depositing of seed and fertilizer, substantial plant loss may result if the fertilizer is placed in the ground too close to the seeds since the fertilizer will burn the roots emerging from the seeds before they have sufficiently matured.

Accordingly, in accordance with a primary feature of the present invention, means are provided for directing the products into the furrows in a desired spaced relationship to prevent the products from being placed too close together in the ground. As mentioned above, this is particularly desirable for the dispensing of fertilizer and seeds to prevent plant loss due to roots of the plants emerging from the seeds and being burned by the fertilizer before the roots have sufficiently matured.

Referring again to the drawings, a pair of spacer plates 40 a and b are provided for directing the metered products into the furrows in a desired spaced relationship. The plates 40 a and b extend downwardly from the dispensing openings 36a and 37a in the channels 36 and 37 so that the lower ends thereof are close to the ground and directly over the respective furrows formed by the two discs 31. Accordingly, as the products are dispensed out of the openings 36a and 37a, they are directed into the furrows by the plates 40a and b and are prevented, by the lower ends of the plates, from being dispensed in the ground too close together.

As may be seen by reference to FIG. 4, the plates 40a and b are pivotally mounted on the support member 30 in flanking relationship therewith for pivotal movement about shaft 42. Accordingly, the plates are free to move up and down with changing ground conditions. Further, for the purpose of allowing the plates 40a and b to move up and down without preventing products from being dispensed through the openings 36a and 37a, recesses 41a and b are provided in the plates at portions adjacent the openings. Without such recesses, the openings 36a and 37a would be blocked by the plates as the plates moved up with the changing ground conditions. Finally, as may be seen by reference to FIG. 3, the lower portion 43 of the dispenser casing 35 forms a spacer block between the spacer plates 40a and b so that the plates are free to move up and down thereadjacent.

In view of the foregoing, it may be seen that a grain drill has been provided for simultaneously metering separate products, such as seed and fertilizer, in predetermined quantities and for dispensing the same in a desired, spaced side-by-side relationship in furrows cut in the ground by a furrow opening device which in turn is carried by the grain drill.

We claim as our invention:

1. In a grain drill including a frame adapted to be coupled to a tractor or the like, the combination which comprises, means including a pair of hopper compartments mounted on the frame, first and second metering devices carried by the frame at the lower portion of the hopper compartments for respectively metering the contents of the compartments, a subframe mounted on the frame, a double disc furrow opener carried on the subframe for cutting parallel furrows in the ground when lowered thereinto, a pair of dispensing nozzles secured to the subframe above the furrow positions and interconnected with the metering devices for dispensing the metered contents of the hopper compartments, and means floatingly mounted on the subframe for directing the metered contents into the furrows in a spaced, side-by-side relationship.

2. In a grain drill including a frame adapted to be coupled to a tractor or the like, the combination which comprises, a pair of hopper compartments mounted on the frame, first and second metering devices carried by the frame at the lower portion of the hopper compartments for respectively metering the contents of the compartments, a subframe mounted on the frame, a double disc furrow opener carried on the subframe for cutting parallel furrows in the ground when lowered thereinto, dispensing means including spacer plates floatingly mounted on the subframe, said dispensing means being associated with the metering devices for dispensing the metered contents and said spacer plates being associated with the dispensing means for directing the metered contents into the furrows in a desired spaced relationship.

3. In a grain drill including a frame adapted to be coupled to a tractor or the like, the combination which comprises, a pair of hopper compartments mounted on the frame, first and second metering devices carried by the frame at the lower portion of the hopper compartments for respectively metering the contents thereof, a subframe mounted on the frame, a double disc furrow opener carried on the subframe for cutting parallel furrows in the ground when lowered thereinto, a dispensing device secured to the subframe and including a pair of channels having openings above the furrow positions, the dispensing device being interconnected with the metering devices for dispensing the metered contents, and means floatingly mounted on the subframe for directing the metered contents into the furrows a desired, lateral distance apart.

References Cited by the Examiner

UNITED STATES PATENTS

| 1,094,422 | 4/1914 | Bottom | 111—85 |
| 2,341,795 | 2/1944 | Friegbaum et al. | 111—80 |
| 2,364,958 | 12/1944 | Drennan | 111—80 |
| 2,713,836 | 7/1955 | Ajero | 111—85 X |
| 2,869,489 | 1/1959 | Buhr | 111—80 |
| 2,920,587 | 1/1960 | Shriver | 111—80 |

FOREIGN PATENTS

| 67,063 | 5/1957 | France. |
| | | (1st edition of 1,012,815) |

ABRAHAM G. STONE, *Primary Examiner.*

WILLIAM A. SMITH III, *Examiner.*